Figure 1:
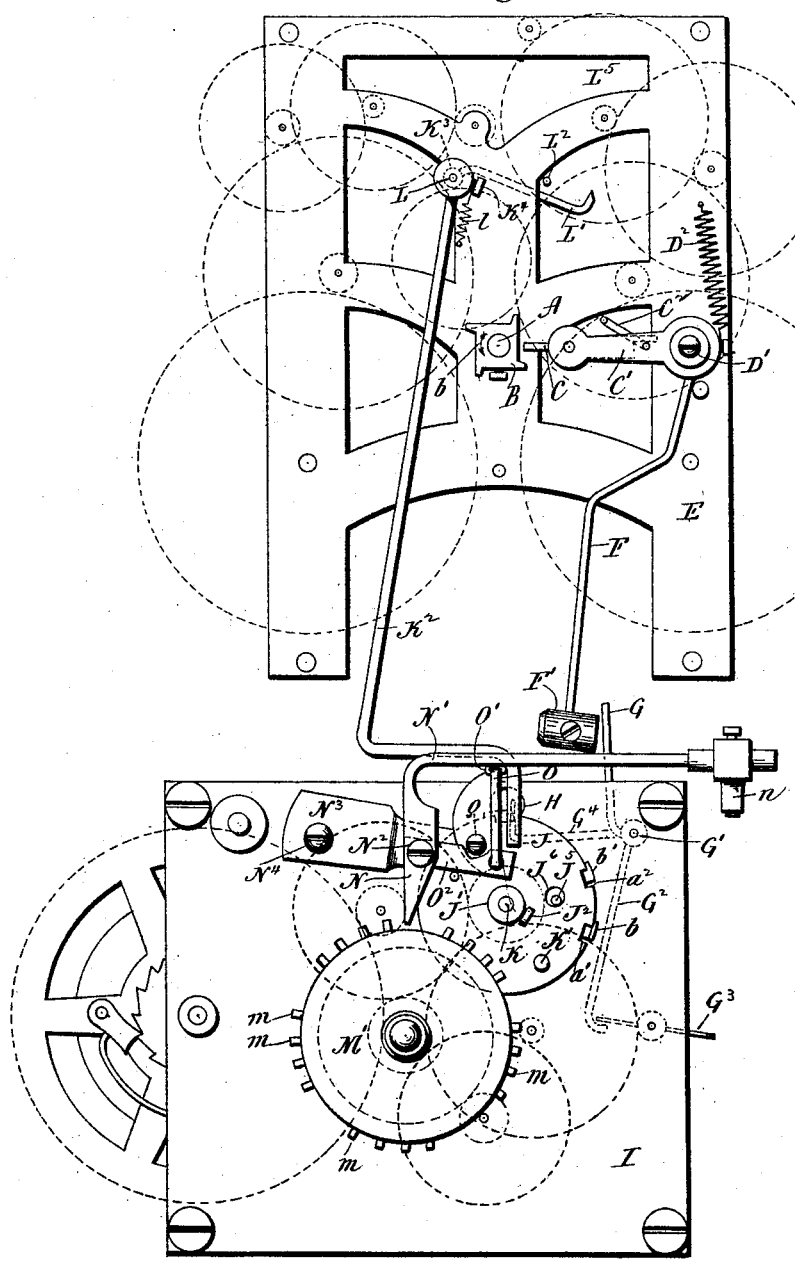

(No Model.) 2 Sheets—Sheet 1.

W. E. PORTER.
CHIMING CLOCK.

No. 592,614. Patented Oct. 26, 1897.

(No Model.) 2 Sheets—Sheet 2.
W. E. PORTER.
CHIMING CLOCK.
No. 592,614. Patented Oct. 26, 1897.
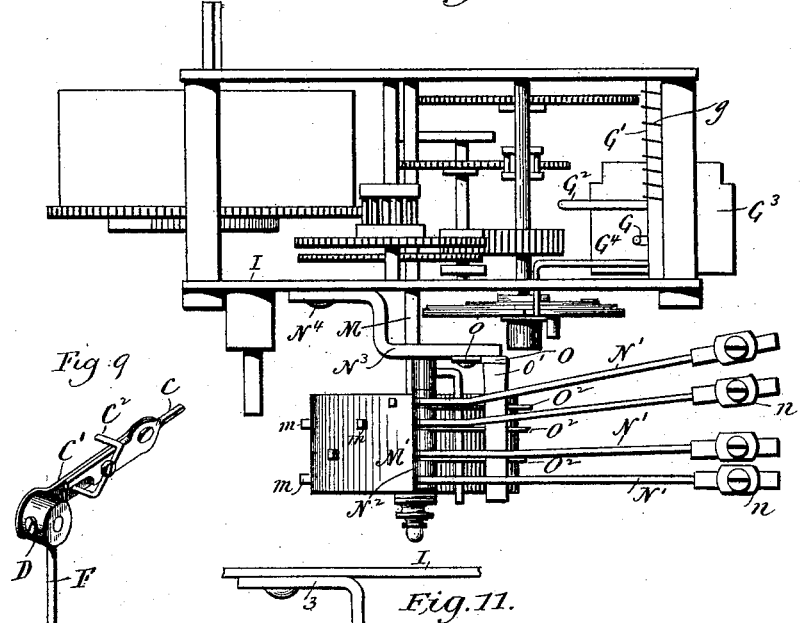
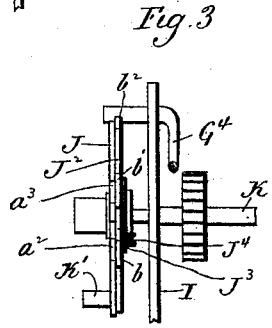
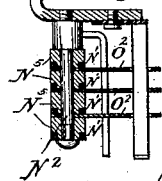
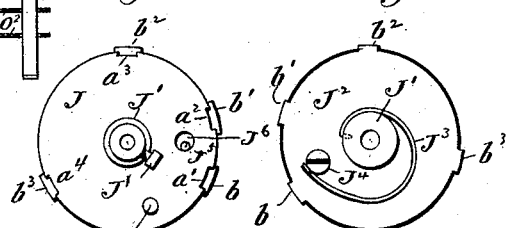
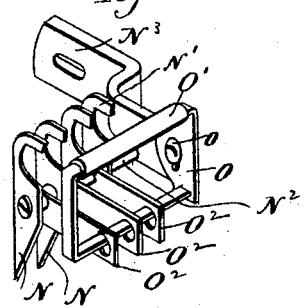
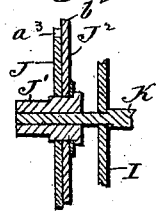
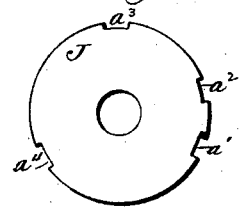
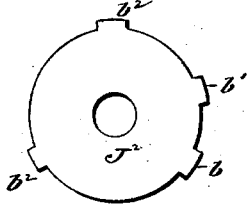

UNITED STATES PATENT OFFICE.

WILSON E. PORTER, OF NEW HAVEN, CONNECTICUT, ASSIGNOR TO THE NEW HAVEN CLOCK COMPANY, OF SAME PLACE.

CHIMING CLOCK.

SPECIFICATION forming part of Letters Patent No. 592,614, dated October 26, 1897.

Application filed May 18, 1897. Serial No. 637,100. (No model.)

*To all whom it may concern:*

Be it known that I, WILSON E. PORTER, of New Haven, in the county of New Haven and State of Connecticut, have invented a new Improvement in Chiming Clocks; and I do hereby declare the following, when taken in connection with the accompanying drawings and the letters of reference marked thereon, to be a full, clear, and exact description of the same, and which said drawings constitute part of this specification, and represent, in—

Figure 1, a view in front elevation of a strike time-movement and a chime-movement operatively connected in accordance with my invention; Fig. 2, a detached plan view of the chime-movement; Fig. 3, a detail view, in side elevation, showing the chime-wheel, the guard-wheel which coacts therewith, and the releasing-hook which coacts with both of the wheels; Fig. 4, a similar sectional view; Fig. 5, a view of the two wheels in front elevation; Fig. 6, a view of the two wheels in rear elevation; Fig. 7, a detached view of the chime-wheel; Fig. 8, a similar view of the guard-wheel; Fig. 9, a detached view, in inside elevation, of the lifting-arm and pivotal turn-back; Fig. 10, a detached perspective view of the chime-lever bracket, the tail ends of the chime-levers, and the adjustable buffer-frame; Fig. 11, a detached view in horizontal section, designed with particular reference to showing the antifriction-plates which isolate the tail ends of the chime-levers from each other.

My invention relates to an improvement in that class of chiming clocks in which the chime-movement is made and organized independently of the time-movement, which is constructed so as to periodically release the chime-movement, which in turn, after it has done chiming, releases the strike-train of the time-movement, the object of my invention being to produce simple and reliable means for securing the above-described coaction between the two movements.

With these ends in view my invention consists in certain details of construction and combinations of parts, as will be hereinafter described, and pointed out in the claims.

In carrying out my invention I employ a time strike-movement of any approved construction. By the term "time strike-movement" I mean a time-movement adapted not only to keep time but also to strike. Upon the rear end of the center arbor A of such a movement I mount a chime-cam B, having four cam-fingers and arranged to coact with the inner end of a turn-back lever C, which is pivotally mounted upon a lifting-arm C' and has its outer end weighted and arranged to be engaged with a guard-wire $C^2$, mounted in the said arm. When the cam B is turned in the direction of the arrow $b$, as it ordinarily is, it engages with the lower face of the inner end of the turn-back lever and lifts the same and, through the medium of the guard-wire $C^2$, the lifting-arm C. On the other hand, when the cam B is turned in the opposite direction, as it is likely to be in setting the clock, its fingers engage with the upper face of the inner end of the turn-back lever, which is then merely tilted on its pivot without affecting the position of the lifting-arm C'. The said lifting-arm is itself secured to a hub D, mounted upon a screw-stud D', entering the rear movement-plate E. A small coiled spring $D^2$, connected with the said hub and with the movement-plate E at a point above the hub, operates by a quick movement to turn the hub on the stud D' when the inner end of the lifting-arm is released by the action of the chime-cam. This spring is the releasing-hammer spring and henceforth will be so called.

From the hub D depends a long hammer-arm F, provided at its lower end with a heavy releasing-hammer F', arranged in position to strike the releasing-wire G of the chime-movement, the said releasing-wire G being mounted in an oscillating arbor G', also carrying a hooked stop-wire $G^2$, which engages with the fly $G^3$ of the said movement and forms a fly-detent, and a releasing-hook $G^4$, which projects rearward through an opening H, formed near the upper edge of the rear movement-plate I of the said movement. The said arbor is furnished with an actuating-spring $g$, as shown in Fig. 2. The said hook $G^4$ coacts with a notched chime-wheel J, rigidly secured to a hub J', furnished with a set-screw $J^7$, by means of which it is adjustably secured to the rear end of the arbor K of the chime-movement. The said notched chime-wheel is formed with four notches $a'$, $a^2$, $a^3$, and $a^4$, differentiated in their separation from each other suitably for chiming on the quarters and on the hour. Coacting with the wheel J and loosely mounted upon the said hub at a point in rear of it and so as to bear against its inner face is a guard-wheel $J^2$, slightly smaller than it is in diameter and formed with four lugs $b$, $b'$, $b^2$, and $b^3$, extending slightly beyond its edge and corresponding in arrangement to its notches $a'$, $a^2$, $a^3$, and $a^4$ aforesaid. The said lugs are maintained in partial registration with the said notches by means of a spring $J^3$, the inner end of which is rigidly secured to the hub $J'$, as shown in Fig. 6, and the outer end of which is connected by means of a screw $J^4$ with the inner face of the guard-wheel, the said spring exerting a constant effort to rotate the guard-wheel, so as to fully register its said lugs with the said notches for completely closing the same. The oscillation of the guard-wheel upon the hub $J'$ is limited by means of a stop-pin $J^5$, mounted in the guard-wheel and extending into a small hole $J^6$, formed in the chime-wheel, as shown in Fig. 5. A starting-pin $K'$, mounted in the chime-wheel and rotating therewith, is provided for actuating the long pendulous starting-wire $K^2$, through the medium of which the chime-movement releases the strike-train of the time-movement, the said starting-wire being provided at its upper end with a hub $K^3$, furnished with a set-screw $K^4$, by means of which the hub is secured to the projecting rear end of an oscillating shaft L, journaled between the plates E of the strike time-movement and oscillated by means of a light spring $l$. (Shown in Fig. 1.) The said shaft L carries a hook $L'$, which coacts with a pin $L^2$, located in the usual manner in the fourth wheel $L^5$ of the strike-train, which it is thought it will be unnecessary to describe in detail, as it may be of any approved construction. The chime-movement, which may also be of any approved construction, includes a heavy shaft M, upon which the chime-drum $M'$ is removably mounted, the said drum being furnished with pins $m$, which coact with the downwardly-projecting tails N of the chime-levers $N'$, which are mounted at a point close above the drum on a shaft $N^2$, carried by a horizontally-adjustable chime-lever bracket $N^3$, attached by a screw $N^4$ to the rear plate of the chime-movement. The outer ends of the said chime-lever are provided with chime-hammers $n$ of any approved form and construction. A frame O, located in a vertical plane at a point in front of the tails of the said chime-levers, is secured by a screw $o$ to the said bracket $N^3$, its upper horizontal reach being furnished with a rubber buffer $O'$, upon which the chime-levers normally rest and upon which their fall is broken.

Small sheet-metal antifriction-plates $O^2$, interposed between the chime-levers at their rear ends and connected with the lower horizontal reach of the buffer-frame, are employed to prevent one chime-lever from being lifted by its neighbor in case of friction between them.

By reference to Fig. 11 of the drawings it will be seen that the tails N of the chime-levers $N'$ are provided with hubs or collets $N^5$, which receive the shaft $N^2$ before mentioned, the said hubs or collets affording the requisite length of bearing for the levers upon the said shaft. The antifriction-plates $O^2$ are interposed between the said hubs, and therefore virtually isolate the tails of the chime-levers, so that the oscillating movement of one lever cannot be communicated to the next adjacent lever, but is taken by the antifriction-plate interposed between the hubs of the two levers.

Having now described my improvement, I will set forth the mode of its operation.

When in the actuation of the time-movement the quarter-hours are completed, the turn-back lever drops off one of the fingers of the chime-cam. The releasing-hammer spring $D^2$ then immediately asserts itself and sharply swings the releasing-hammer $F'$ against the releasing-wire G, whereby the arbor $G'$ is oscillated sufficiently to lift the releasing-hook out of that one of the notches in the chime-wheel in which it is at the time located. The moment the hook is lifted out of the notch the spring $J^3$ of the guard-wheel acts to oscillate the guard and bring the lugs of the guard-wheel $J^2$ into full registration with the notches thereof, so that when the hook is raised and before it has had time to drop back one of the lugs of the guard-wheel is shot under it, whereby the hook is prevented from reëntering the same notch in the chime-wheel. The same movement of the releasing-arbor $G'$ that lifted the releasing-hook out of engagement with the chime-wheel also lifted the stop-wire $G^2$ or fly-detent out of engagement with the fly $G^3$, permitting the train to start, so that the starting of the chime-train is practically simultaneous with the lifting of the releasing-hook. As soon as the chime-train starts the chime-wheel begins to rotate under the releasing-hook, which rides for the nonce upon the lug immediately under it of the guard-wheel. The chime-movement having thus been started, the chime-drum is revolved, causing its pins to coact with the tails of the chime-levers, which act in ringing the chime upon any suitable arrangement of bells or gongs. After the releasing-hook has ridden off from the lug which prevented it from reëntering the notch from which it was lifted the hook rides during the ringing of the chime upon the edge of the chime-wheel until the chime stops ringing, the riding of the said hook upon the periphery of the chime-wheel maintaining the fly-detent in a position in which it clears the fly. The hook then engages with the next lug of the guard-cam, which it stops from rotating with the chime-wheel.

The chime-wheel, however, continues to be rotated now against the tension of the spring $J^3$ of the guard-wheel, but only for a fractional distance, for almost immediately after the stopping of the guard-wheel the releasing-hook drops into the next notch in the chime-wheel. During the chiming of the hour the starting-pin in the chime-wheel engages with the starting-wire depending from the time-movement and releases the same just as soon as the hour has been chimed. The spring $l$ on the arbor L of the time-movement then oscillates the said arbor so as to disengage the stop-hook L' from the stop-pin $L^2$ on the fourth wheel of the strike-train, which is thus released and allowed to strike the hour, the striking of the hour following closely on the chiming of the hour. It will thus be seen that the time-movement is employed to start the chime-movement, and that in turn the chime-movement is employed to release the strike-train of the time-movement, so that the striking of the clock will follow the chiming of the clock.

It is apparent that in practicing my invention some changes from the construction herein shown and described may be made. I would therefore have it understood that I do not limit myself to the exact construction herein shown, but hold myself at liberty to make such changes and alterations as fairly fall within the spirit and scope of my invention.

Having fully described my invention, what I claim as new, and desire to secure by Letters Patent, is—

1. In a chiming clock, the combination with the time-movement thereof, of an independently-organized chime-movement, means applied to the time-movement and actuated thereby for releasing the chime-movement train, a releasing-hook, a notched chime-wheel coacting with the said hook, a guard-cam coacting with the said hook, and provided with lugs corresponding to the notches of the chime-wheel, a starting-pin carried by the chime-wheel, and a starting-lever coacting with the said pin, and depending from the time-movement, and connected therein with the strike-train thereof for releasing the said train through the agency of the chime-movement.

2. In a chime-movement, the combination with a releasing-hook and means for actuating the same, of a chime-wheel provided with notches to receive the said hook, an oscillating guard-cam furnished with lugs for coaction with the notches of the said wheel and projecting slightly beyond the periphery thereof, and a spring connected with the guard-cam for oscillating it, and shooting its lugs into full registration with its notches when the releasing-hook is lifted out of the same.

3. In a chime-movement, the combination with a releasing-hook and means for actuating the same, of a chime-wheel provided with notches to receive the said hook, a guard-cam mounted upon the hub of the chime-wheel so as to oscillate thereupon, and formed with lugs corresponding to the notches of the said wheel, and projecting slightly beyond the periphery of the same, means for limiting the oscillation of the guard-cam, and a spring coacting with the guard-cam to oscillate it so as to bring its lugs into complete registration with the said notches when the releasing-hook is lifted out of the same.

4. In a chime-movement, the combination with a chime-drum of chime-levers the tails of which are engaged by pins in the drum, a chime-lever bracket carrying a stud upon which the said levers are mounted, and a buffer-frame connected with the chime-lever bracket, and supporting the chime-levers in their normal positions, and means connected with the said frame for providing for the independent action of the said levers by isolating them as to the communication of friction from one to the other.

In testimony whereof I have signed this specification in the presence of two subscribing witnesses.

WILSON E. PORTER.

Witnesses:
J. FAYETTE DOUGLASS,
HENRY W. PORTER.